(12) United States Patent
Le et al.

(10) Patent No.: US 11,594,777 B2
(45) Date of Patent: Feb. 28, 2023

(54) DUAL ENERGY STORAGE SYSTEM AND STARTER BATTERY MODULE

(71) Applicant: CPS Technology Holdings LLC, New York, NY (US)

(72) Inventors: Daniel B. Le, Grafton, WI (US); David R. Boone, Waukesha, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

(21) Appl. No.: 17/220,984

(22) Filed: Apr. 2, 2021

(65) Prior Publication Data
US 2021/0226287 A1 Jul. 22, 2021

Related U.S. Application Data

(62) Division of application No. 16/301,315, filed as application No. PCT/US2017/032878 on May 16, 2017, now Pat. No. 10,978,684.

(Continued)

(51) Int. Cl.

| | |
|---|---|
| *H01M 50/20* | (2021.01) |
| *H01M 10/06* | (2006.01) |
| *H01M 10/48* | (2006.01) |
| *B60L 58/12* | (2019.01) |
| *B60L 58/20* | (2019.01) |
| *B60L 50/60* | (2019.01) |
| *B60K 6/28* | (2007.10) |
| *B60R 16/033* | (2006.01) |

(Continued)

(52) U.S. Cl.
CPC .............. *H01M 50/20* (2021.01); *B60K 6/28* (2013.01); *B60L 50/60* (2019.02); *B60L 58/12* (2019.02); *B60L 58/20* (2019.02); *B60R 16/033* (2013.01); *H01M 10/0525* (2013.01); *H01M 10/06* (2013.01); *H01M 10/48* (2013.01); *B60L 58/18* (2019.02); *B60Y 2200/91* (2013.01); *B60Y 2200/92* (2013.01); *B60Y 2400/112* (2013.01); *H01M 4/131* (2013.01); *H01M 4/525* (2013.01); *H01M 10/052* (2013.01); *H01M 2220/20* (2013.01); *Y02E 60/10* (2013.01); *Y02T 10/70* (2013.01)

(58) Field of Classification Search
CPC .. H01M 50/20; H01M 10/0525; H01M 10/06; H01M 10/48
See application file for complete search history.

(56) References Cited

U.S. PATENT DOCUMENTS

| | | | |
|---|---|---|---|
| 2015/0202984 A1* | 7/2015 | Wyatt | ................. H01M 50/172 320/109 |
| 2015/0202985 A1 | 7/2015 | Le | |
| 2019/0198833 A1 | 6/2019 | Le | |

OTHER PUBLICATIONS

International Search Report and Written Opinion for PCT/US2017/032872 dated Aug. 28, 2017, 19 pages.

* cited by examiner

*Primary Examiner* — Olatunji A Godo
(74) *Attorney, Agent, or Firm* — Boardman & Clark LLP (57) ABSTRACT

The present disclosure relates to a dual energy storage system that includes a lithium ion battery electrically coupled in parallel with a lead acid battery, where the lithium ion battery and the lead-acid battery are electrically coupled to a vehicle bus, where the lithium ion battery open circuit voltage (OCV) partially matches the lead-acid battery OCV such that the lead-acid battery OCV at 100% of the lead-acid battery state of charge (SOC) is about equal to the lithium ion battery OCV at 50% of the lithium ion battery SOC.

14 Claims, 8 Drawing Sheets

Related U.S. Application Data (60) Provisional application No. 62/337,128, filed on May 16, 2016.

(51) Int. Cl.
*H01M 10/0525* (2010.01)
*H01M 10/052* (2010.01)
*H01M 4/525* (2010.01)
*H01M 4/131* (2010.01)
*B60L 58/18* (2019.01)

DUAL ENERGY STORAGE SYSTEM AND STARTER BATTERY MODULE

CROSS-REFERENCE TO RELATED APPLICATIONS

This application is a continuation of U.S. application Ser. No. 16/301,315 entitled "DUAL ENERGY STORAGE SYSTEM AND STARTER BATTERY MODULE." filed on Nov. 13, 2018, now U.S. Pat. No. 10,978,684, which claims priority to U.S. National Stage Application under 35 U.S.C. § 371 of International Application No. PCT/US17/32878 entitled "12 VOLT DUAL ENERGY STORAGE SYSTEM AND 12 VOLT STARTER BATTERY," filed on 16 May 2017, which claims priority to and the benefit of U.S. Provisional Application Ser. No. 62/337,128, entitled "12 VOLT DUAL ENERGY STORAGE SYSTEM AND 12 VOLT STARTER BATTERY," filed 16 May 2016, both of which are incorporated by reference herein in their entirety for all purposes.

BACKGROUND

The present disclosure relates generally to the field of batteries and battery modules. More specifically, the present disclosure relates to lithium ion battery cells that may be used with a dual energy storage system and starter battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid electric vehicles (FHEVs) may provide motive and other electrical power to the vehicle using one or more electric motors, using only an internal combustion engine, or using both. In contrast, mild hybrid electric vehicles (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operate at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, battery modules that include battery cells with relatively high nominal voltages may reduce a size and cost of the battery module because fewer battery cells are included within the battery module. Additionally, it is also desirable for battery modules to be configured to operate within existing electrical networks of xEVs without disrupting operation of the xEV electrical network.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a dual energy storage system that includes a lithium ion battery electrically coupled in parallel with a lead acid battery, where the lithium ion battery and the lead-acid battery are electrically coupled to a vehicle bus, where the lithium ion battery open circuit voltage (OCV) partially matches the lead-acid battery OCV such that the lead-acid battery OCV at 100% of the lead-acid battery state of charge (SOC) is about equal to the lithium ion battery OCV at 50% of the lithium ion battery SOC.

The present disclosure also relates to a system that includes a lithium ion starter battery, a lead acid battery electrically coupled in parallel with the lithium ion starter battery, and a vehicle having a vehicle bus configured to establish an electrical pathway between the lithium ion starter battery, the lead acid battery, and the vehicle, and where the lithium ion starter battery open circuit voltage (OCV) partially matches the lead-acid battery OCV such that the lead-acid starter battery OCV at 100% of the lead-acid battery state of charge (SOC) is about equal to the lithium ion starter battery OCV at 50% of the lithium ion starter battery SOC.

The present disclosure also relates to a method that includes measuring a voltage of a lithium ion battery cell using a voltage sensor, estimating a state of charge (SOC) of the lithium ion battery cell based on the voltage of the lithium ion battery cell and a voltage profile of the lithium ion battery cell, and determining a diagnostic parameter of the lithium ion battery cell based on the SOC of the lithium ion battery cell, the voltage of the lithium ion battery cell, or both.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

xEvs may include a lead acid battery module (e.g., having an open circuit voltage of 12V at 100% state of charge) and a Li-ion battery module (e.g., having an open circuit voltage of between 12.5V and 16V at 100% state of charge) coupled to one another in a parallel configuration. In certain instances, the lead acid battery module may be used to start and/or ignite an internal combustion engine of the xEV, whereas the Li-ion battery module may be used to capture power from a regenerative braking system and to provide electricity to vehicle components when the internal combustion engine is idle. Additionally or alternatively, the Li-ion battery module may be utilized as a starter battery and provide power to start and/or ignite an internal combustion engine of the xEV. Accordingly, Li-ion batteries in 12V vehicle architectures can apply to 12V Dual Energy Storage Systems (DESS) and 12V starter applications. Unfortunately, to supply a sufficient amount of power, Li-ion battery modules include a plurality of individual Li-ion battery cells, which may add weight to the xEV and/or decrease fuel economy.

The present disclosure addresses these and other shortcomings of traditional Li-ion battery modules. For example, embodiments of the present disclosure relate to high voltage Li-ion battery cells that may form a Li-ion battery module configured to be utilized in existing electrical networks of an xEV without disrupting the xEV electrical network (e.g., the battery module provides power within a predetermined range). The high voltage Li-ion battery cells may reduce a size (e.g., volume) of the overall battery module by reducing a number of Li-ion battery cells that are included in the battery module. Further, the high voltage Li-ion battery cells may reduce costs of the battery module because of the reduced number of the Li-ion battery cells.

In some embodiments, the Li-ion battery module is configured to have an open circuit voltage (OCV) at 50% state of charge (SOC) that is substantially equal to (e.g., within 10% of, within 5% of, or within 1% of) the OCV of the lead acid battery module at 100% SOC of the lead acid battery module. Thus, the Li-ion battery module may be configured to receive charge (e.g., via regenerative braking system) while the lead acid battery is configured to provide power (e.g., to the ignition system or other electrical components of the xEV during rapid discharge conditions). Further, each Li-ion battery cell of the Li-ion battery module may have a particular chemical configuration that enables a voltage profile of the Li-ion battery cell to have an increased slope (e.g., a voltage profile having a steeper incline). Increasing the slope of the voltage profile enables an accurate estimation of SOC of an individual Li-ion battery cell based on a measured voltage of the individual Li-ion battery cell. The estimated SOC and/or the measured voltage enables a diagnostic parameter and/or status of the individual Li-ion battery cell (or, in some cases, the overall battery module) to be determined.

Figure 1:
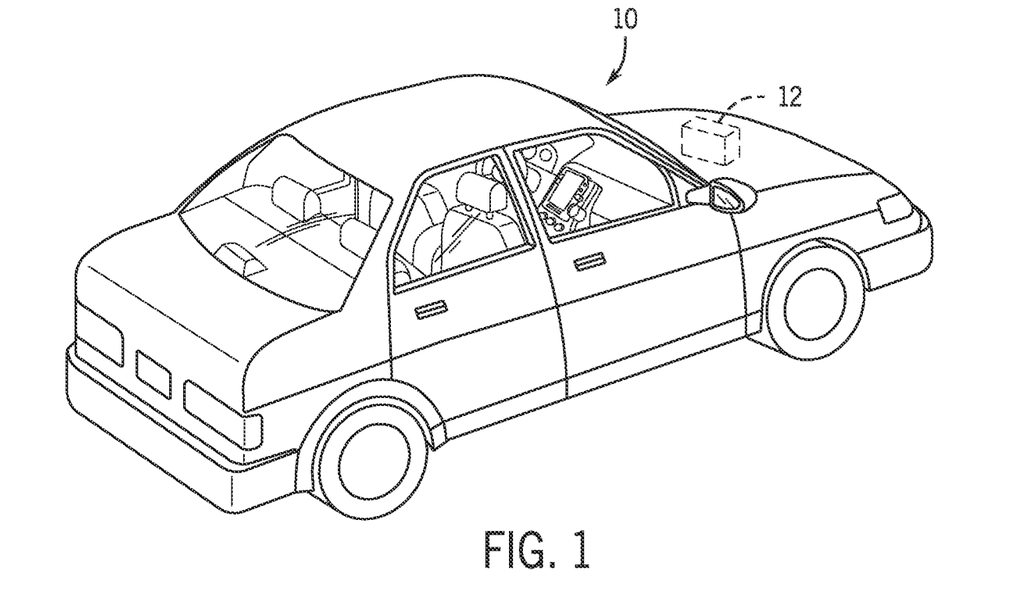
FIG. 1 is a perspective view of a vehicle having a battery system configured in accordance with present embodiments to provide power for various components of the vehicle, in accordance with an aspect of the present disclosure.

To help illustrate the manner in which the present embodiments may be used in a system, FIG. 1 is a perspective view of an embodiment of a vehicle 10 (e.g., an xEV), which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles. Further, embodiments may be employed in stationary power systems as well.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10).

Figure 2:
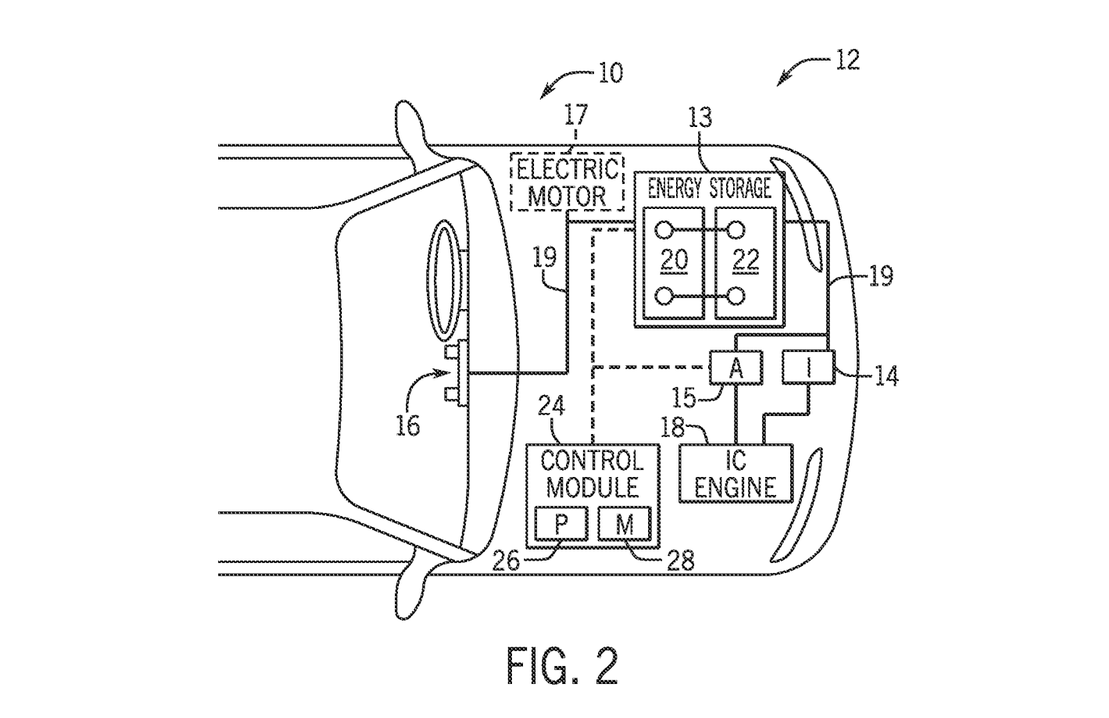
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a Li-ion (e.g., a first) battery module 20 in accordance with present embodiments, and a lead-acid (e.g., a second) battery module 22, where each battery module 20, 22 includes one or more battery cells (e.g., individually sealed battery cells). In other embodiments, the energy storage component 13 may include any number of battery modules. Additionally, although the Li-ion battery module 20 and lead-acid battery module 22 are depicted adjacent to one another, they may be positioned in different areas around the vehicle. For example, the lead-acid battery module 22 may be positioned in or about the interior of the vehicle 10 while the Li-ion battery module 20 may be positioned under the hood of the vehicle 10.

In some embodiments, the energy storage component 13 may include multiple battery modules to utilize multiple different battery chemistries. For example, when the Li-ion battery module 20 is used, performance of the battery system 12 may be improved since the Li-ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within the energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge (SOC) of each battery module 20 or 22, determine a temperature of each battery module 20 or 22, control voltage output by the alternator 15 and/or the electric motor 17, and the like.

Accordingly, the control module 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control module 24 may include portions of a vehicle control unit (VCU) and/or a separate battery control module.

As discussed above, Li-ion batteries in 12V vehicle architectures can apply to 12V Dual Energy Storage Systems (DESS) and 12V starter applications. In a 12V DESS application, the Li-ion battery 20 (e.g., a module having several Li-ion battery cells) may be connected in parallel to the lead acid (PbA) battery 22, and both may be connected to the vehicle's electrical bus 19. For 12V DESS, it is now recognized that it may be desirable for the Li-ion battery open circuit voltage (OCV) to partially match the lead acid battery OCV, such that the OCV of the lead acid battery at 100% state of charge (SOC) is about equal to the OCV of the Li-ion battery at 50% SOC. An example of this OCV relationship is set forth in FIG. 3.

Figure 3:
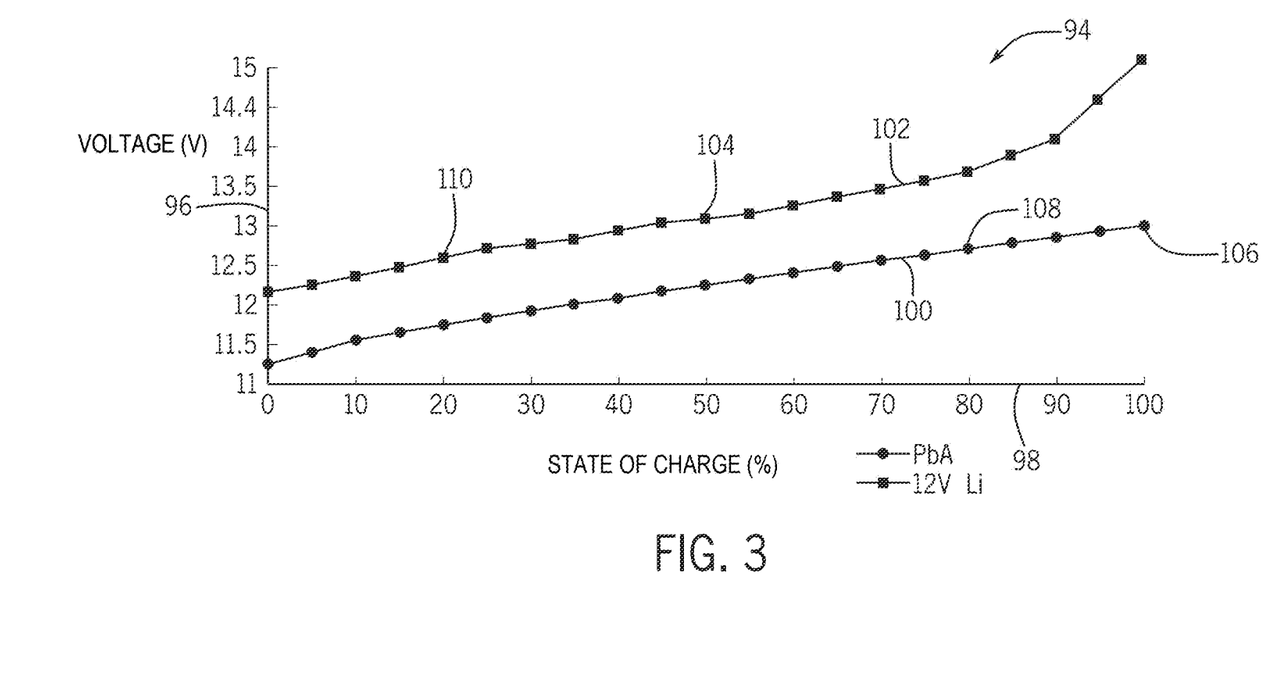
FIG. 3 is an embodiment of a chart illustrating a voltage profile for a lead acid battery module and a lithium ion battery module, in accordance with an aspect of the present disclosure.

FIG. 3 is an embodiment of a chart 94 illustrating OCV 96 as a function of SOC 98 for the lead-acid battery 22 (e.g., represented by line 100) and the Li-ion battery 20 (e.g., represented by line 102). As shown in the illustrated embodiment of FIG. 3, the 12V Li-ion battery system 20 has a voltage profile where at 50% SOC (shown at point 104), the Li-ion battery system 20 has a voltage of about (e.g., within 10% of, within 5% of, within 1% of) 13V. At 100% SOC, the lead acid battery 22 has a voltage (as shown at point 106) that is about equal to (e.g., within 10% of, within 5% of, within 1% of) the voltage of the Li-ion battery system 20 at 50% SOC (as shown at point 104). To the extent that the lead acid battery 22 and Li-ion battery 20 voltages do not exactly match, it is presently recognized that the voltage of the Li-ion battery 20 at 50% SOC may be within about 150 milliVolts (mV) or between 1% and 2% of the lead acid battery 22 voltage at 100% SOC.

This OCV/SOC relationship between the lead acid battery 22 and the Li-ion battery 20 may enable the DESS to be balanced in a way that enables top end regenerative capacity and low end discharge capacity. More specifically, this relationship encourages charge acceptance using the Li-ion battery 20 during times of regeneration (e.g., charging), and encourages discharging from the lead acid battery 22 in times where rapid discharge is experienced by the energy storage component 13.

The top end regenerative capacity may generally correspond to the ability of the Li-ion battery 20 to accept charge from a regenerative system (e.g., a regenerative braking system) even when the lead acid battery 22 is at 100% SOC. The low end discharge capacity may generally correspond to the ability of the lead acid battery 22 to provide discharge current even when the Li-ion battery 20 is at 50% SOC. Additionally or alternatively, the low end discharge capacity may correspond to the ability of the Li-ion battery 20 to provide discharge current when the lead acid battery 22 is at its lowest desired operating SOC (e.g., 80% SOC). For example, the Li-ion battery 20 may have an SOC greater than 10% at a voltage where the lead acid battery 22 is at 80% SOC. In the illustrated embodiment of FIG. 3, the lead acid battery 22 has a voltage of about 12.6V at 80% SOC (as shown at point 108), and the Li-ion battery 20 has an SOC of about (e.g., within 10% of, within 5%, or within 1% of) 20% at 12.6V (as shown at point 110).

As discussed above, it is also now recognized that it may be desirable for the voltage profile of the Li-ion battery 20 to have some degree of curvature within its expected SOC operating range. For example, certain diagnostic measurements relating to the Li-ion battery 20 may be performed based on voltage measurements and associated SOC estimates to determine diagnostic parameters, such as a health of the Li-ion battery 20 and/or a remaining operating life of the Li-ion battery 20. More specifically, the voltage of the Li-ion battery 20 may be measured (e.g., via a voltage sensor), and the SOC of the Li-ion battery 20 may be estimated based on the Li-ion battery voltage measurements. If the voltage remains relatively flat across a wide SOC range (i.e., the profile has little to no curvature or a very small slope), then small changes in the voltage measurement may cause relatively large changes in SOC estimation. Thus, it may be desirable to design the Li-ion battery 20 to have a voltage profile with a slope that is sufficiently larger than the degree of voltage measurement uncertainty, which may enable robust SOC estimation.

Such a Li-ion battery 20 could be developed using 4, 5, or 6 Li-ion battery cells (see, e.g., FIGS. 5-8). However, the system costs, system footprint, system cooling requirements, and similar considerations relating to the Li-ion battery module, may be directly related to the number of battery cells in the system. To reduce total system costs, either alone or in combination with reducing system footprint and cooling requirements, it may be desirable to have the minimum number of battery cells in the system that provides the voltage matching described above. For a 4-cell system, a Li-ion battery cell with a nominal voltage of about 3.25V may be appropriate. For a 5-cell system, a Li-ion battery cell with a nominal voltage of about 2.6V may be appropriate. Such Li-ion battery cells could also be used to produce a 12V starter battery. The battery-level voltage could be compliant to existing vehicle voltage architectures, and would also benefit total system cost reduction by minimizing the total cell count. In accordance with present embodiments, each of the Li-ion battery cells may combine to produce a nominal battery module voltage of between 12V and 16V, between 12.5V and 15.5V, or between 13V and 15V. Further, in some embodiments, the Li-ion battery module 20 may have a voltage between 12.5 and 13.5V, between 12.8V and 13.4V, or between 13V and 13.2V at 50% SOC. As such, the Li-ion battery module 20 may be configured to operate within the electrical bus 19 of the vehicle 10 without disrupting the bus 19 (e.g., the bus 19, or components associated with the bus 19, may be sensitive at voltages above 15.5V and below 12.5V) and/or the control module 24. For example, in some cases a battery module that operates with a voltage that is above a high voltage threshold (e.g., 15.5V or 16V) or below a low voltage threshold (e.g., 11V or 12.5V) may interfere with the control module 24 and/or other electronic components associated with the bus 19. Therefore, the Li-ion battery module 20 of the present disclosure may reduce and/or eliminate interference with the control module 24 and/or the bus 19.

Figure 4:
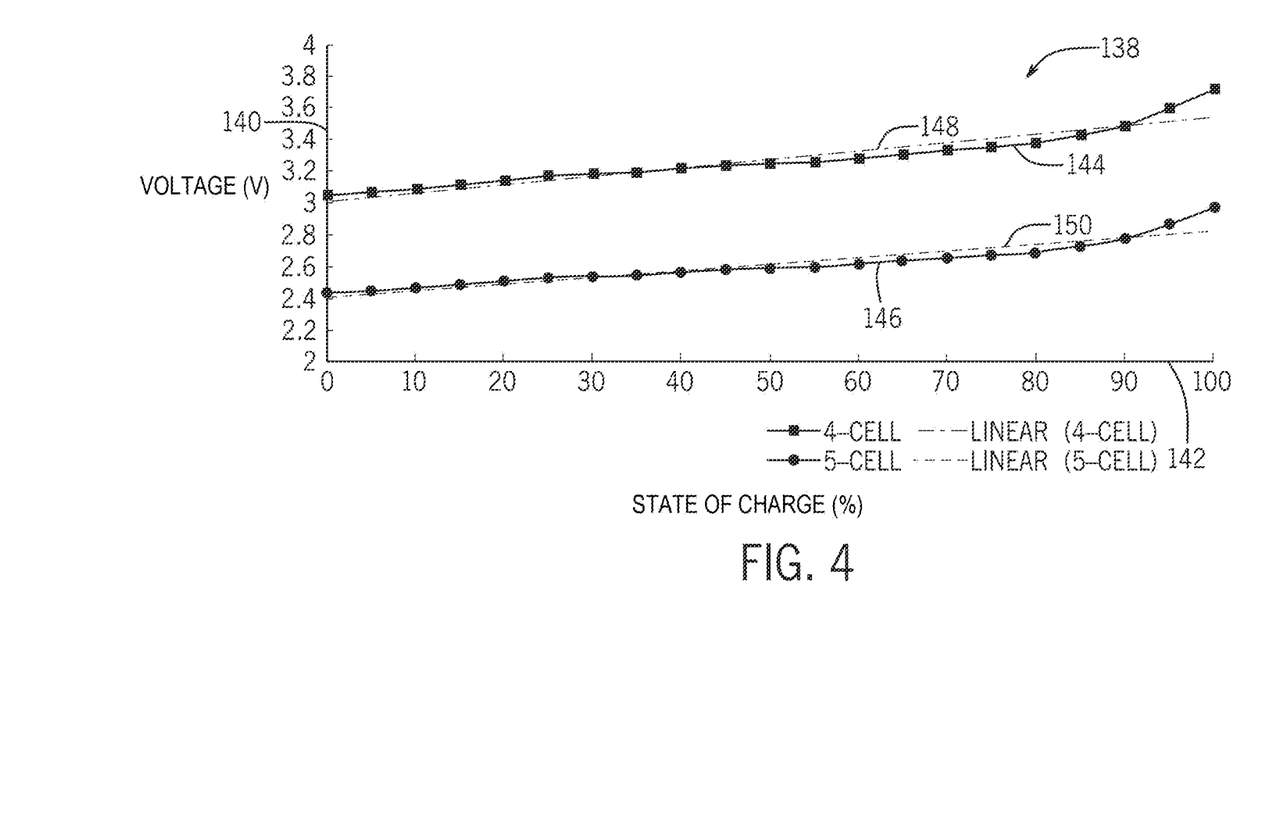
FIG. 4 is an embodiment of a chart illustrating example voltage profiles for individual lithium ion battery cells of the lithium ion battery module when the lithium ion battery module includes four lithium ion battery cells or five lithium ion battery cells, in accordance with an aspect of the present disclosure.

FIG. 4 is an embodiment of a chart 138 illustrating battery voltage 140 (e.g., OCV) as a function of SOC 142 for each Li-ion battery cell of a 4-cell Li-ion battery module (represented by line 144) and a 5-cell Li-ion battery module (represented by line 146). For the 4-cell architecture, as shown by line 144, each Li-ion battery cell has a higher nominal voltage when compared to the 5-cell architecture. Further, at 50% SOC, each of the Li-ion battery cells of the 4-cell architecture has an OCV of about 3.26 V. For a 5-cell architecture, each Li-ion battery cell has a slightly lower nominal voltage as compared to the 4-cell architecture, and has an OCV of about 2.6 V at 50% SOC.

As discussed above, an increased slope of the voltage profile for the Li-ion battery cells may facilitate an estimation of SOC based on a voltage measurement of the Li-ion battery cell. As shown in the illustrated embodiment of FIG. 4, linear trend lines were calculated to fit the actual voltage profiles for both the Li-ion battery cells of the 4-cell Li-ion battery module (as shown by line 148) and the 5-cell Li-ion battery module (as shown by line 150). The linear trend lines each include a slope that characterizes a change in voltage of the Li-ion battery cell as a function of change in SOC of the Li-ion battery cell. The slope of the linear trend lines of FIG. 4 is referred to herein as an average slope of the voltage profiles of the Li-ion battery cells. The linear trend line of the Li-ion battery cell of the 4-cell Li-ion battery module 20 includes an average slope of approximately (e.g., within 10% of, within 5% of, or within 1% of) 0.0056 Volts/SOC (%). The linear trend line of the Li-ion battery cell of the 5-cell Li-ion battery module 20 includes an average slope of approximately 0.0045 Volts/SOC (%). Accordingly, in some embodiments, the Li-ion battery cells may include a voltage profile having an average slope of between 0.0010 Volts/SOC (%) and 0.010 Volts/SOC (%), between 0.0020 Volts/SOC (%) and 0.0080 Volts/SOC (%), or between 0.0040 Volts/SOC (%) and 0.0060 Volts/SOC (%). While the trend lines in the illustrated embodiment of FIG. 4 are linear, it should be recognized that other suitably shaped trend lines may be calculated to determine a slope of the voltage profiles (a change in voltage as a function of SOC) for the Li-ion battery cells and/or to estimate the SOC of the Li-ion battery cells.

Figure 5:
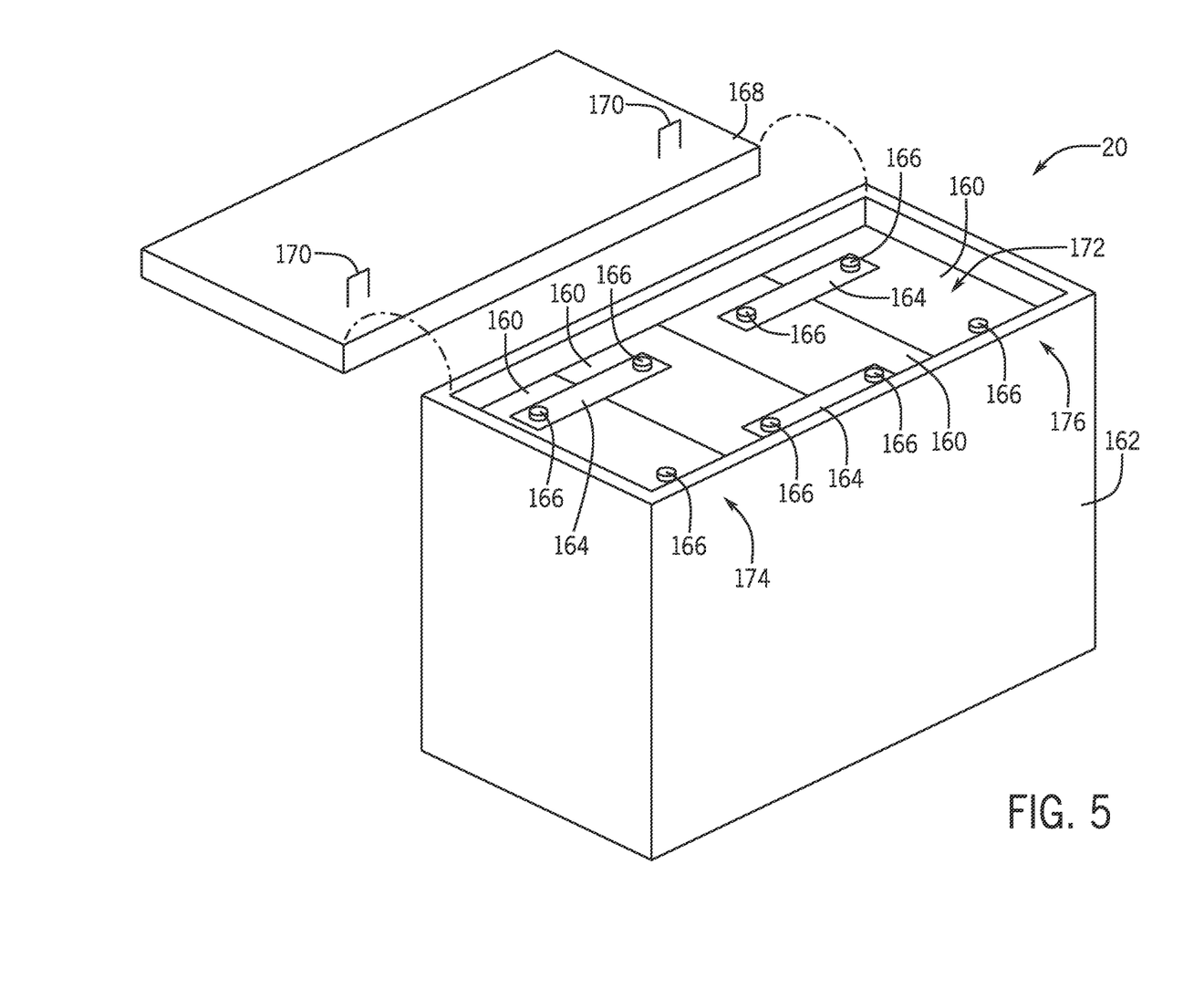
FIG. 5 is a perspective view of an embodiment of the lithium ion battery module having four lithium ion battery cells, in accordance with an aspect of the present disclosure.

FIG. 5 is a perspective schematic view of an embodiment of the Li-ion battery module 20 having four Li-ion battery cells 160 in a four by one arrangement. As shown in the illustrated embodiment of FIG. 5, each of the four Li-ion battery cells 160 are disposed in a battery module housing 162. Further, the four Li-ion battery cells 160 may be coupled to one another via bus bars 164 disposed over battery cell terminals 166. In some embodiments, each of the four Li-ion battery cells 160 are coupled to one another in series to form the Li-ion battery module 20 having a voltage of 12V. As such, the bus bars 164 may connect a positive terminal of a Li-ion battery cell 160 to a negative terminal of an adjacent Li-ion battery cell 160 to couple the Li-ion battery cells 160 in series. However, in other embodiments, the Li-ion battery cells 160 may be coupled to one another in another suitable configuration to form the Li-ion battery module 20 having a voltage 12V.

Further, a lid 168 having module terminals 170 may be disposed over an opening 172 of the housing 162. The module terminals 170 may be coupled to battery cell terminals 166 at respective ends 174 and 176 of the battery module housing 160 in order to establish an electrical connection between the Li-ion battery cells 160 and the module terminals 170. Accordingly, the module terminals 170 may be coupled to the electrical bus 19 and/or another suitable device to provide power from the Li-ion battery cells 160 to a load.

Figure 6:
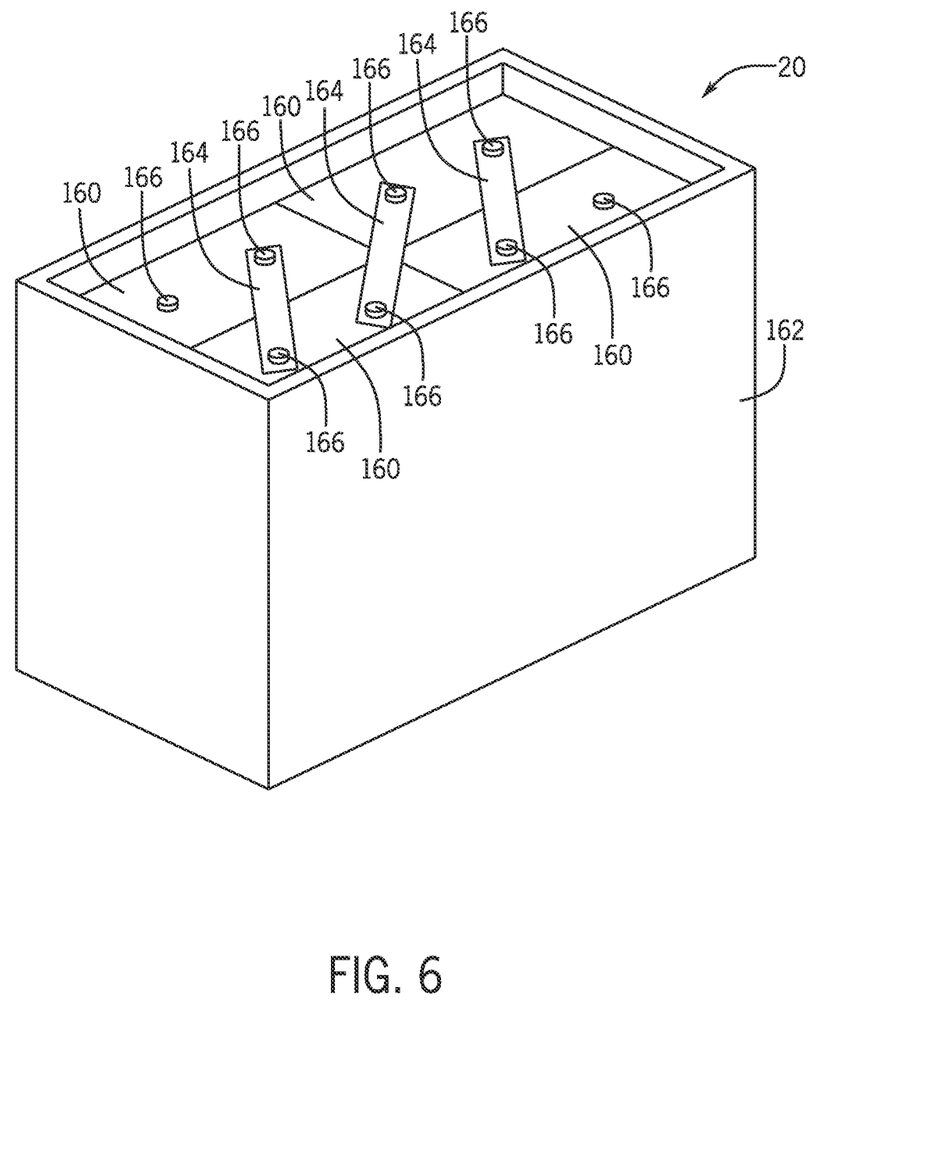
FIG. 6 is a perspective view of an embodiment of the lithium ion battery module having four lithium ion battery cells arranged in a two by two arrangement, in accordance with an aspect of the present disclosure.

FIG. 6 is a perspective schematic view of an embodiment of the Li-ion battery module 20 having four of the Li-ion battery cells 160 in a two by two arrangement. As shown in the illustrated embodiment of FIG. 6, the Li-ion battery cells 160 are still coupled to one another in series, such that the bus bars 164 couple a positive terminal of a Li-ion battery cell 160 to a negative terminal of an adjacent Li-ion battery cell 160 (e.g., either directly adjacent or diagonally adjacent). While the bus bars 164 are shown in a diagonal configuration between the battery cell terminals 166, it should be recognized that other battery cell terminal 166 and bus bar 164 configurations may be utilized.

Figure 7:
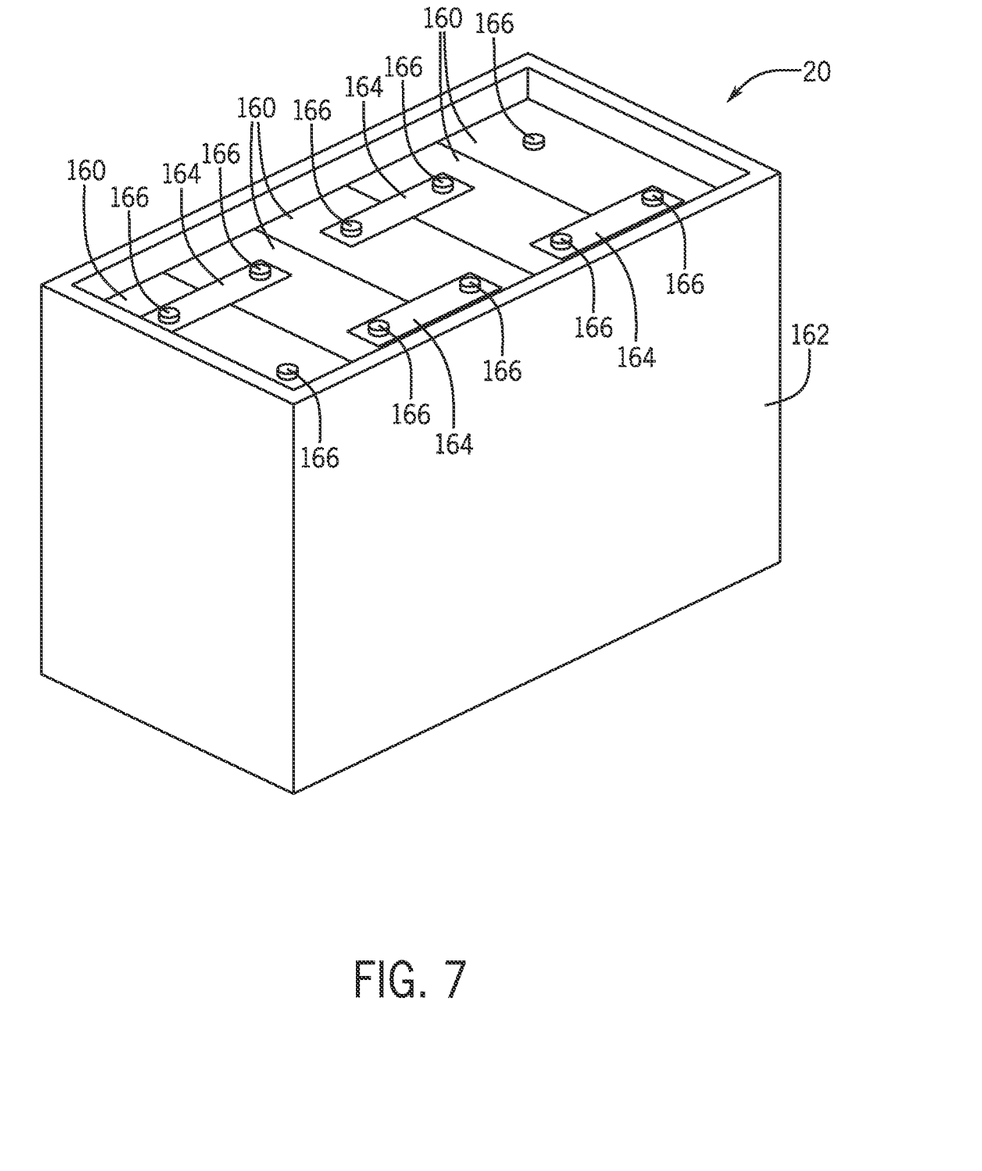
FIG. 7 is a perspective view of an embodiment of the lithium ion battery module having five lithium ion battery cells, in accordance with an aspect of the present disclosure.
Figure 8:
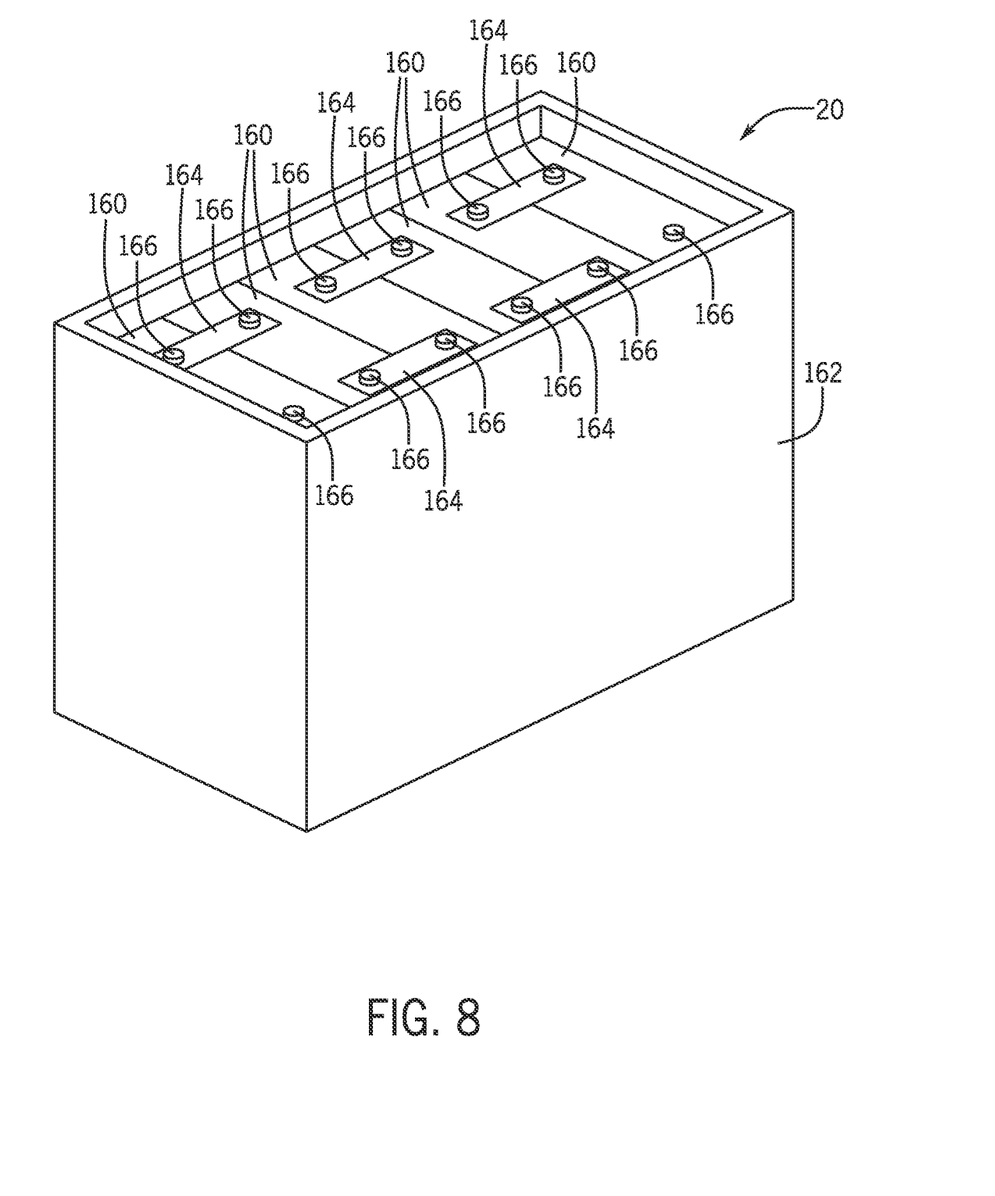
FIG. 8 is a perspective view of an embodiment of the lithium ion battery module having six lithium ion battery cells, in accordance with an aspect of the present disclosure.

FIGS. 7 and 8 are perspective schematic views of embodiments of the Li-ion battery module 20 having five of the Li-ion battery cells 160 and six of the Li-ion battery cells 160, respectively. Again, the Li-ion battery cells 160 may be coupled to one another in a series configuration and/or another suitable configuration to form the Li-ion battery module 20 having a voltage of 12V.

The amount of the Li-ion battery cells 160 included in the battery module 20 (e.g., 4, 5, 6, or another suitable amount) may be dependent on a chemical configuration of the Li-ion battery cells 160, which produces a predetermined nominal voltage (e.g., 2.6V or 3.26V). Generally, Li-ion battery cells will include a cathode (a positive electrode), an anode (a negative electrode), and an electrolyte. The cathode and anode each include an electrode active material that enables the electrodes to store and transfer ions (e.g., Li-ions) during charging and discharging cycles. Whether the electrode active material is suitable for the cathode or the anode is generally determined by the reference voltage of the electrode active material versus $Li^+/Li^0$. The negative electrode active materials of the Li-ion battery cells may be considered to include electrode active materials having a voltage that is lower versus $Li^+/Li^0$ compared to the positive electrode active materials. The nominal voltages set forth above may be achieved primarily through appropriate selection and combination of active material chemistries for the cathode as well as the use of a suitable anode active material, although electrolyte chemistry may also have an effect on cell operation. For instance, the nominal voltage of the Li-ion battery cells may be the voltage of the positive electrode active material versus $Li^+/Li^0$, less the voltage of the negative electrode active material versus $Li^+/Li^0$.

The electrode active materials may generally be of any type, configuration, or chemistry, as long as the combination of cathode active materials and anode active materials provide the nominal voltages and voltage profiles set forth above. As an example, the anode active material may include graphite or may include a titanate-based material (e.g., lithium titanate, LTO). The cathode active material may include any one or a combination of different lithiated metal oxides, mixed metal oxide components, or lithium metal phosphates.

As used herein, lithiated metal oxides and mixed metal oxide components for the cathode active material may refer to any class of materials whose formula includes lithium and oxygen as well as one or more additional metal species (e.g., nickel, cobalt, manganese, aluminum, iron, or another suitable metal). A non-limiting list of example lithiated metal oxides may include: mixed metal compositions including lithium, nickel, manganese, and cobalt ions such as lithium nickel cobalt manganese oxide (NMC, $LiNi_xMn_yCo_zO_2$, where x+y+z=1), lithium nickel cobalt aluminum oxide (NCA) (e.g., $LiNi_xCo_yAl_zO_2$, where x+y+z=1), lithium cobalt oxide (LCO) (e.g., $LiCoO_2$), and lithium manganese oxide spinel (LMO-spinel) (e.g., $LiMn_2O_4$).

Layered-layered material and/or layered-layered spinel material may also be utilized as a cathode active material. Layered-layered materials may have the formula: $xLi_2M^1O_3 \cdot (1-x)LiM^2O_2$, wherein: $M^1$ is Mn, Ti, Zr, and combinations thereof; $M^2$ is Mn, Ni, Co, Cr, and combinations thereof, and x is greater than 0 and smaller than 1. As a further example, layered-layered materials may include $xLi_2MnO_3 \cdot (1-x)LiMO_2$ (M=Mn, Ni), and may have relatively high reference voltages (>4.4 V vs. $Li^+/Li^0$). Layered-layered spinel materials have a similar structure, and also include an embedded spinel component. A spinel structure may refer to a chemical substance that has a cubic, close-packed lattice configuration. Such layered-layered spinel materials may be produced by reducing the overall lithium content of a parent layered-layered material, while maintaining the Mn:M ratio at a constant value. One example of a layered-layered spinel may be represented by the formula $Li_xMn_{0.65}Ni_{0.35}O_y$, for which the end members are $0.3Li_2MnO_3 \cdot 0.7LiMn_{0.5}Ni_{0.5}O_2$ (x=1.3; y=2.3), in which the average manganese and nickel oxidation states are 4+ and 2+, respectively, and $LiMn_{1.3}Ni_{0.7}O_4$ (x=0.5; y=2) in which the corresponding average oxidation states are expected to lie between 4+ and 3.77+ for Mn, and 2.57+ and 3+ for Ni, respectively. Certain layered-layered spinel cathode materials may have voltages higher than 4.4 V vs. $Li^+/Li^0$, such as up to about 5 V vs. $Li^+/Li^0$.

Such materials may be considered high voltage spinel (HVS) active materials, and may be referenced using spinel notation. HVS materials may have a chemical formula of $LiM_xMn_{2-x}O_4$ (using conventional spinel notation), where x may be between 0.35 and 0.65 and M represents a metal, such as a transition metal. As an example, the metal (M) may be nickel, chromium, iron, or another transition metal. In certain embodiments, HVS may have the chemical formula $LiMn_{1.5}Ni_{0.5}O_4$, or $LiNi_{0.4}Mn_{1.6}O_4$, or $LiNiMnO_4$, for example. Further, such embodiments of HVS may be metal doped on the nickel side (e.g., to replace a portion of the Ni with another metal) or metal doped on the manganese side (e.g., to replace a portion of the Mn with another metal). In certain embodiments, HVS has a nominal voltage of about 4.4 V versus $Li^+/Li^0$, although higher voltages may be achieved through appropriate selection of constituent layers (e.g., in a layered-layered material).

Lithium metal phosphates for the cathode active material may refer to materials whose formula includes lithium and phosphate as well as one or more additional metal species (e.g., nickel, cobalt, manganese, iron, or another suitable metal). For example, such lithium metal phosphates may be represented as $LiMPO_4$, wherein M is Mn, Co, Ni, Fe, Zn, Cu, Ti, Sn, Zr, V, Al, and mixtures thereof. A non-limiting list of example lithium metal phosphates may include: lithium nickel phosphate ($LiNiPO_4$), lithium cobalt phosphate ($LiCoPO_4$), lithium nickel manganese phosphate ($LiNiMnPO_4$), lithium iron phosphate ($LiFePO_4$), and lithium manganese iron phosphate ($LiMnFePO_4$).

Again, the cathode active materials may be used alone or in an appropriate combination to achieve a suitable nominal voltage and voltage profile. Each combination may provide a particular nominal voltage and a particular voltage profile. As an example, a first cathode active material may be combined (e.g., physically blended) with one or more second cathode active materials, and the blended combination may be coated onto an appropriate collector to produce a cathode. Accordingly, each Li-ion battery cell may include a cathode having one, two, three or more active materials. Thus, the Li-ion battery cells described herein may each have a cathode formed using any one or a combination of active materials selected from a group including or, alternatively, consisting of: $LiNi_xMn_yCo_zO_2$, where $x+y+z=1$; $LiNi_xCo_yAl_zO_2$, where $x+y+z=1$; $LiCoO_2$; $LiMn_2O_4$; $LiM_xMn_{2-x}O_4$; where x may be between 0.35 and 0.65 and M is nickel, chromium, or iron; $LiMPO_4$, wherein M is Mn, Co, Ni, Fe, Zn, Cu, Ti, Sn, Zr, V, Al, and mixtures thereof such as $LiNiPO_4$; $LiCoPO_4$; $LiNiMnPO_4$; $LiFePO_4$; and $LiMnFePO_4$.

In accordance with certain embodiments of the present disclosure, the negative electrode active materials may include certain titanate species (e.g., LTO), graphite, or a combination of the two. In still further embodiments, the negative electrode active material may include other electrode active materials either alone or in combination with LTO and/or graphite. Additionally, in certain embodiments LTO may have a spinel structure. As a non-limiting example, LTO may have a chemical formula of $Li_4Ti_5O_{12}$. LTO may be cation doped and/or anion doped via metal doping or electronegative atom doping, respectively. One example is metal fluorine doping. Doping may change the chemical formula of LTO to $M-Li_4Ti_5O_{12}$, where M represents a metal, such as a transition metal. As an example, the metal (M) may be barium, strontium, molybdenum, neodymium, nickel, manganese, chromium, tungsten, lanthanum, or another transition metal. Additionally, or alternatively, LTO may be carbon coated such that the LTO used to produce the negative electrode may include between 0.05% and 1% by weight carbon nanotubes or carbon nanofibers. The carbon coating may enhance conductivity of the LTO, and may passivate the LTO (e.g., via a passive layer) to suppress gas generation from a reaction with electrolyte. To form carbon coated LTO, a mechanical mixing process, such as milling, may be used. In certain embodiments, LTO may have a voltage of about 1.55V versus $Li^+/Li^0$.

In view of the foregoing, it should be appreciated that a number of different chemistries may be utilized in accordance with the nominal voltage and voltage profile considerations described herein. It is presently contemplated that battery cells having the nominal voltage and voltage profiles described herein may be produced using appropriate selection of one or a combination of the lithium metal oxide, lithium metal phosphate, high voltage spinel, or layered-layered cathode materials described above.

For a 4-cell system having the desired voltage profile, and in which each cell has a nominal voltage of about 3.26 V, it is presently contemplated that such battery cells may be produced using specific cathode and anode active materials. For instance and by way of non-limiting example, higher voltage cathode materials such as HVS, either alone or in combination with one or more lithium metal oxides (e.g., NMC, NCA) may be utilized. In such embodiments, LTO may be used as the anode active material. When graphite is used as the anode active material, such high voltage cathode active materials may not necessarily be required, but may be used where deemed beneficial. For a 5-cell system in which each cell has a nominal voltage of about 2.6 V, a wide variety of cathode and anode active materials may be chosen.

Figure 9:
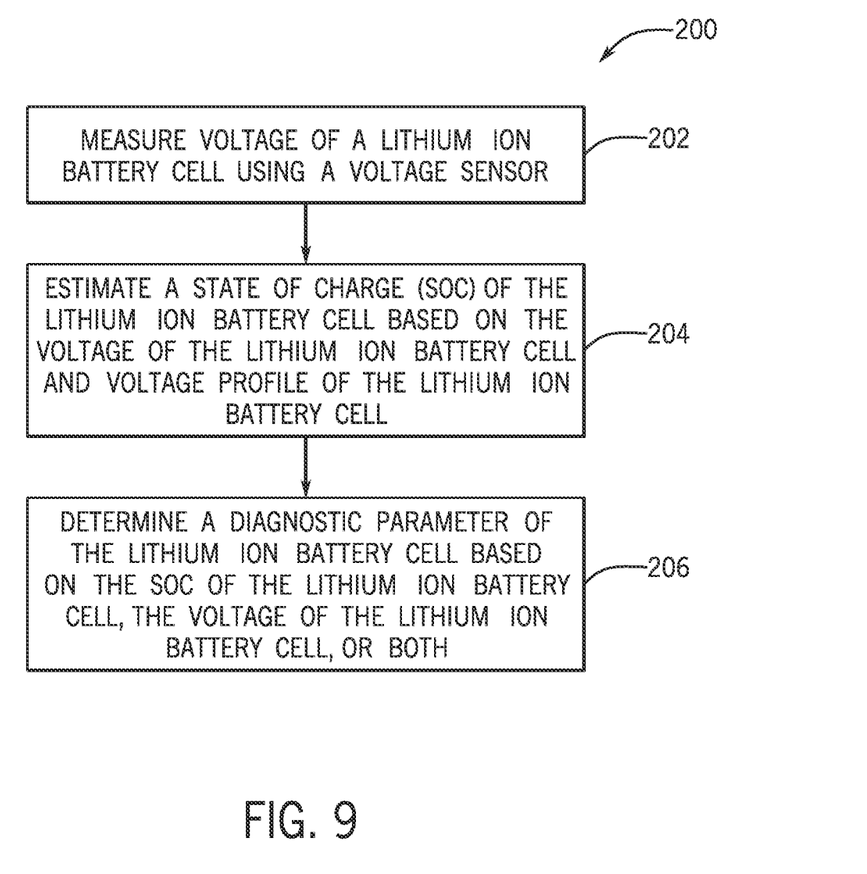
FIG. 9 is a flow chart of an embodiment of a process for determining a diagnostic parameter of a lithium ion battery cell, in accordance with an aspect of the present disclosure.

FIG. 9 is a flow chart of an embodiment of a process 200 that is utilized to determine a diagnostic parameter and/or status of a Li-ion battery cell 160 (e.g., a health of the Li-ion battery cell 160, an operating life of the Li-ion battery cell 160, a remaining charge of the Li-ion battery cell 160, among others). For example, at block 202, a voltage of the Li-ion battery cell 160 is measured using a voltage sensor disposed in the housing 162 of the Li-ion battery module 20. In some embodiments, the voltage measurement of the Li-ion battery cell 160 may be directed to the control module 24 as feedback. The control module 24 may store the voltage profile of the Li-ion battery cell 160 in the memory 28 and estimate the SOC of the Li-ion battery cell 160 based on the measured voltage, as shown at block 204.

Further, the control module 24 may utilize the SOC and/or the voltage measurement of the Li-ion battery cell 160 to determine a diagnostic parameter and/or status of the Li-ion battery cell 160, as shown at block 206. For example, the control module 24 may utilize the SOC and/or the voltage of the Li-ion battery cell 160 to calculate and/or estimate a health of the Li-ion battery cell 160, an operating life of the Li-ion battery cell 160, a remaining charge of the Li-ion battery cell 160, a capacity of the Li-ion battery cell 160, a resistance of the Li-ion battery cell 160, a current of the Li-ion battery cell 160, a temperature of the Li-ion battery cell 160, degradation of the anode and/or the cathode of the Li-ion battery cell 160, or a combination thereof.

One or more of the disclosed embodiments, alone or in combination, may provide one or more technical effects useful in the manufacture of battery modules, and portions of battery modules. In general, embodiments of the present disclosure include an improved Li-ion battery module that includes a voltage at 50% SOC that is substantially equal to (e.g., within 10% of, within 5% of, or within 1% of) a voltage of a lead acid battery module at 100% SOC. As such, the Li-ion battery module may regenerate (e.g., receive electrical power) even when the lead acid battery is at full SOC, and the lead acid battery may supply power (e.g., to an xEV) when the Li-ion battery module is at less than 100% SOC. Further, each Li-ion battery cell of the Li-ion battery module may include a voltage profile having an increased slope to facilitate a determination of a diagnostic parameter and/or status of the Li-ion battery cell. Further, the Li-ion battery cells may include a chemical configuration that enables the Li-ion battery cells to produce a relatively high voltage. Accordingly, a number of the Li-ion battery cells may be reduced, thereby reducing a size and/or a cost of the Li-ion battery module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A method, comprising:
   measuring a voltage of a lithium ion battery cell using measurement electronics, the measurement electronics comprising a voltage sensor;
   estimating a state of charge (SOC) of the lithium ion battery cell based on the voltage of the lithium ion battery cell and a voltage profile of the lithium ion battery cell, the voltage profile being defined by a relationship between a voltage of for lithium ion battery cell and a state of charge for the lithium ion battery cell, wherein the voltage profile of the lithium ion battery cell comprises a slope that is larger than a degree of voltage measurement uncertainty associated with the measurement electronics of the lithium ion battery; and
   determining a diagnostic parameter of the lithium ion battery cell based on the SOC of the lithium ion battery cell, the voltage of the lithium ion battery cell, or both.

2. The method of claim 1, wherein the lithium ion battery cell is part of a dual energy storage system of a vehicle or a cell of a lithium ion starter battery.

3. The method of claim 1, wherein the voltage profile of the lithium ion battery has an average slope between 0.0040 V/SOC (%) and 0.0060 V/SOC (%).

4. The method of claim 1, wherein the lithium ion battery cell has a nominal voltage of about 2.6 V or a nominal voltage of about 3.26 V.

5. The method of claim 1, wherein the diagnostic parameter includes a health of the lithium ion battery cell or a remaining operating life of the lithium ion battery cell.

6. A dual energy storage system comprising:
   a lithium ion battery cell;
   measurement electronics to measure a voltage of the lithium ion battery cell, the measurement electronics comprising a voltage sensor; and
   a control module including a memory, wherein the voltage measured by the voltage sensor is stored on the memory, the control module to
      estimate a state of charge of the lithium ion battery cell based on the voltage of the lithium ion battery cell and a voltage profile of the lithium ion battery cell, the voltage profile defined by a relationship between the voltage for the lithium ion battery cell and the state of charge for the lithium ion battery cell, and wherein the voltage profile of the lithium ion battery cell comprises a slope that is larger than a degree of voltage measurement uncertainty associated with measurement electronics of the lithium ion battery, and
      determine a diagnostic parameter of the lithium ion battery cell based on the state of charge of the lithium ion battery cell, the voltage of the lithium ion battery cell, or both.

7. A vehicle comprising the dual energy storage system of claim 6.

8. The dual energy storage system of claim 6, wherein the voltage profile of the lithium ion battery has an average slope between 0.0040 V/SOC (%) and 0.0060 V/SOC (%).

9. The dual energy storage system of claim 8, wherein the average slope is 0.0045V/SOC (%).

10. The dual energy storage system of claim 8, wherein the average slope is 0.0056V/SOC (%).

11. The dual energy storage system of claim 6, wherein the lithium ion battery cell has a nominal voltage of about 2.6 V or a nominal voltage of about 3.26 V.

12. The dual energy storage system of claim 6, wherein the lithium ion battery cell has a nominal voltage of about 3.26V.

13. The dual energy storage system of claim 6, wherein the lithium ion battery cell has a nominal voltage of about 2.6V.

14. The dual energy storage system of claim 6, wherein the lithium ion battery cell has a cathode formed from one or more cathode active materials selected from the group consisting of: $LiNi_xMn_yCo_zO_2$, where $x+y+z=1$; $LiNi_xCo_yAl_zO_2$, where $x+y+z=1$; $LiCoO_2$; $LiMn_2O_4$; $LiNiMnO_4$, $LiM_xMn_{2-x}O_4$; where x may be between 0.35 and 0.65 and M is nickel, chromium, or iron; $LiMPO_4$, wherein M is Mn, Co, Ni, Fe, Zn, Cu, Ti, Sn, Zr, V, Al, and mixtures thereof (such as $LiNiPO_4$; $LiCoPO_4$; $LiNiMnPO_4$; $LiFePO_4$; and $LiMnFePO_4$).

* * * * *